(12) United States Patent
Hermann

(10) Patent No.: US 6,868,941 B1
(45) Date of Patent: Mar. 22, 2005

(54) SECURITY BELT

(76) Inventor: Michael Hermann, Industriestrasse 25, 89269 Vöhringen (DE)

( * ) Notice: Subject to any disclaimer, the term of this patent is extended or adjusted under 35 U.S.C. 154(b) by 0 days.

(21) Appl. No.: 10/130,236

(22) PCT Filed: Nov. 15, 2000

(86) PCT No.: PCT/DE00/03962

§ 371 (c)(1),
(2), (4) Date: Sep. 10, 2002

(87) PCT Pub. No.: WO01/35791

PCT Pub. Date: May 25, 2001

(30) Foreign Application Priority Data

Nov. 15, 1999 (DE) .................................... 299 20 015 U
Dec. 30, 1999 (DE) .................................... 299 22 991 U

(51) Int. Cl.[7] ............................. A47L 3/04; E06C 5/34; G08B 23/00
(52) U.S. Cl. .......................... 182/3; 182/18; 340/573.1
(58) Field of Search .......................... 182/3, 231, 236, 182/10, 16, 19, 36, 6, 7, 233; 340/573.1

(56) References Cited

U.S. PATENT DOCUMENTS

| | | | |
|---|---|---|---|
| 1,716,689 A | | 6/1929 | Freemark |
| 4,305,069 A | | 12/1981 | Machen et al. |
| 4,418,337 A | | 11/1983 | Bader |
| 4,480,716 A | * | 11/1984 | Soubry et al. ............... 182/233 |
| 4,665,389 A | | 5/1987 | Clendening |
| 4,714,135 A | | 12/1987 | Bell et al. |
| 4,814,632 A | * | 3/1989 | Glaeser et al. ............ 340/573.1 |
| 4,938,435 A | | 7/1990 | Varner et al. |
| 5,148,002 A | * | 9/1992 | Kuo et al. .................. 219/211 |
| 5,457,440 A | * | 10/1995 | Daddono ................. 340/573.4 |
| 5,581,901 A | * | 12/1996 | Takahashi .................... 182/231 |
| 5,982,904 A | | 11/1999 | Eghtesadi et al. |
| 5,988,315 A | * | 11/1999 | Crane ............................ 182/3 |
| 5,990,793 A | * | 11/1999 | Bieback ................... 340/573.1 |
| 6,091,331 A | * | 7/2000 | Toft et al. .................... 340/540 |
| 6,222,484 B1 | * | 4/2001 | Seiple et al. ........... 342/357.09 |
| 6,239,700 B1 | * | 5/2001 | Hoffman et al. ......... 340/573.1 |
| 6,268,798 B1 | * | 7/2001 | Dymek et al. ........... 340/573.1 |
| 6,525,662 B1 | * | 2/2003 | Ford ....................... 340/573.1 |
| 6,529,131 B2 | * | 3/2003 | Wentworth .............. 340/573.1 |

FOREIGN PATENT DOCUMENTS

| | | |
|---|---|---|
| CA | 2183473 | 3/1998 |
| CH | 181 655 | 12/1935 |
| DE | 297 06 814 | 7/1997 |
| DE | 197 29 645 | 1/1999 |

* cited by examiner

Primary Examiner—Hugh B. Thompson, II
(74) Attorney, Agent, or Firm—Collard & Roe, P.C.

(57) ABSTRACT

The invention relates to a security belt, in particular for personal protection, which can be attached and fixed to the human body. The belt comprises at least two belt sections which enable the security belt to be fitted and removed and a fixing element for connecting the belt sections in a secure and detachable manner. The security belt has at least one fixing device for various security and safety elements, which is connected to at least one of the belt sections in a fixed manner. The weight and dimensions of the security belt which encompasses the fixing device are configured in such a way that the security belt is very comfortable to wear and allows extensive freedom of movement over long periods of time during daily activities.

32 Claims, 1 Drawing Sheet

SECURITY BELT

This application is a 371 of International Application PCT/DE00/03962, filed Nov. 15, 2000.

CROSS REFERENCE TO RELATED APPLICATIONS

Applicant claims priority under 35 U.S.C. §119 of German Application Nos. 299 20 015.9 and 299 22 991.2 filed Nov. 15, 1999 and Dec. 30, 1999, respectively. Applicant also claims priority under 35 U.S.C. §120 of PCT/DE00/03962 filed Nov. 15, 2000. The international application under PCT article 21(2) was not published in English.

The invention relates to a safety belt, in particular for personal protection, which can be put on and fastened to the human body and which has at least two belt parts which permit the safety belt to be put on and removed, and a fastening element for securely connecting the belt parts in a releasable fashion.

More and more people feel subjected to increasing risks due to fires, in particular in tall buildings or in tunnels or else storms, floods, avalanches or increasingly large-scale natural catastrophes caused by earthquakes. In addition, there is an increasing need for protection against criminals carrying out acts of physical or sexual violence.

For such purposes, a series of safety belts for personal protection have become known. These are safety belts for special tasks with special safety or protection functions which are tailored to these tasks. These safety belts are provided to be worn only for a relatively brief time during the safety application. Wearing such safety belts over a relatively long time period, for example, over an entire day or during everyday work or activities is not possible, or is possible only with considerable restrictions.

Accordingly, one object of the invention is to provide a safety belt which avoids the disadvantages which are known from the prior art.

This object is achieved by means of the features of claim 1, in particular by virtue of the fact that the safety belt has at least one fastening device for a variety of safety or protection elements, which device is securely connected to at least one of the belt parts, the safety belt which comprises the fastening device being embodied in its dimensions and its weight in such a way that the safety belt can even be worn over relatively long time periods and when carrying out activities of daily life [lacuna] favorable wearing comfort and with a large degree of freedom of movement.

As a result, it is then possible for the first time to provide a multifunctional safety belt which can be worn even over relatively long time periods during everyday business or private activities and which complies with the requirements of the person wearing the safety belt both in terms of the wearing comfort and the freedom of movement.

The fastening device is advantageously securely connected to at least one cable which preferably has one free end and which is embodied in terms of its cross section and its material properties in such a way that in particular manual unrolling and rolling up of the cable is made possible. In emergencies, for example in house fires or hazardous situations, the person wearing the belt can advantageously use this cable for abseiling, it being easily possible to manually unroll or stretch the cable owing to its flexibility or elasticity and also easily roll it up again manually, or place it in loops and then fasten it in a compact fashion to the safety belt after a safety application.

Two cables are advantageously provided. As a result, particularly favorable stability conditions can be achieved when abseiling and favorable handling can be achieved. Moreover, the safety margins can be considerably increased or even more favorable handling conditions can be achieved by reducing the cross sections of the cable.

In the state in which the safety belt is being worn, each cable is advantageously assigned lateral force-transmitting points which are formed under load and which are at a distance from one another, which permits a stable position of the human body.

It goes without saying that the cable is configured here in terms of its cross section and its material properties in such a way that it safely bears at least the weight of a human body, that is to say that of the person wearing the safety belt, without tearing.

The fastening device is advantageously securely connected to at least one braking element which can be coupled to the cable and is preferably embodied with a drag clutch, in order to brake the cable which is tensile-loaded or the body. This permits controlled and metered braking during abseiling.

This can be facilitated further if the braking element is provided with a braking-force transmitting means for transmitting the braking force to the cable, which means is provided with a setting means for variably setting the level of the braking force, the setting means being preferably manually adjustable, in particular using a rotary position transducer.

It is particularly advantageous if the setting means is coupled to a mechanism which permits the level of the braking force to be set as a function of particular body positions and/or of the stressing of the cable. As a result, advantageous manual or even automatic control of the braking force can be achieved, which increases the safety when abseiling even further.

Furthermore, it is advantageous if the fastening device is securely connected to a cable pulley for rolling up or unrolling the cable, which pulley preferably has a restoring element, in particular a rotary spring, which supports the rolling up of the cable. As a result, particularly favorable spatial conditions can be achieved while maintaining a high degree of freedom of movement, together with favorable manual handling during the rolling up or unrolling of the cable. It is particularly advantageous here if the axis of rotation of the cable pulley is arranged perpendicular to the fastening element or to the longitudinal axis of the body or of the back of the belt carrier. As a result, favorable installation conditions can be achieved in conjunction with a particularly flat design of the fastening device so that the freedom of movement of the wearer of the belt is not restricted or is restricted only insignificantly.

The safety belt is expediently securely connected to a fastening element for fastening a force-transmitting element, for example a cable, a chain or a rod, and is preferably fastened in such a way that, in the closed state of the safety belt, the fastening element is arranged in a region of the safety belt which lies opposite one or more force application points of the cable or cables, which are formed under load. If the fastening element is therefore embodied, for example, as an eyelet, the safety belt can also be used as a securing device or for securely fastening objects.

It is particularly advantageous if the fastening device is securely connected to a signal transmitter which is controlled manually and/or [lacuna] at least one sensor, and emits preferably visual, audible, electrical and/or electromagnetic alarm signals. As a result, in emergency situations, the wearer of the belt can advantageously draw attention to himself or, by manually activating the signal transmitter, can achieve a warning effect which can deter potential criminals from a criminal act and can cause them to flee. As it is also possible in such emergency situations that the wearer of the safety belt may lose consciousness or may no longer be capable of activating the signal transmitter manually for other reasons, one or more suitable alarm signals may be advantageously emitted by means of the automatic sensor control of the signal transmitter. For this purpose, the sensor can expediently be designed as a sensor for sensing ambient conditions such as the temperature, the humidity, the composition of the air, the smoke content and/or the like. A plurality of such sensors or multifunctional sensors can advantageously be used so that the safety belt can be used to automatically emit a suitable alarm signal in a wide variety of emergency situations depending on the respective ambient conditions such as extreme heat or cold, the wearer being located in water and/or when smoke or dangerous gases are formed. This favorably permits the wearer of the belt who is in an emergency situation to be quickly located, the alarm signals being advantageously configured such that they can be used for taking bearings by radio or the like.

It is of particular advantage if the fastening device is securely connected to an electrical alarm system and to an independent power source for supplying the alarm system with electric power, the alarm system being advantageously embodied with a transmitter and/or a receiver. As a result, the wearer of the belt who is in difficulties can be located particularly favorably and quickly. A person can be located with even greater precision if the alarm system is embodied in such a way that it permits satellite-supported locating of the safety belt, the alarm system being preferably configured as a GPS system. In the same way as the signal transmitters 33, 34, 35, 36, 37, the alarm system 40 can also be activated under sensor control or by [sic] manually, by means of the activation pushbutton key 68 here.

In addition, it is expedient if the fastening device is releasably or captively connected to a manually activatable safety aid for breaking panes of glass. As a result, ways of escape can favorably be created by breaking panes of glass, for example windows and panes of glass in doors. This provides those affected with a rapid means of escape.

The safety belt can expediently have a receptacle device for holding a safety cover which is preferably constructed with aluminum. Safety covers which are coated, for example, with aluminum and which permit advantageous protection against heat and/or protection against excessive cooling are suitable for this.

It is also expedient if the safety belt has a security mark for personal identification, which cannot be viewed in the state in which the belt is being worn. As a result, the personal data is advantageously protected against unauthorized third parties, but is available in an emergency to authorized persons for rapid identification of the person concerned.

It is of particular advantage if the fastening device has a device for wire-free transmission of voice, in particular, a radio telephone. As a result, the wearer of the safety belt, and if appropriate also the persons providing assistance, are able both to request assistance quickly and to provide detailed information on the person in question, the type of emergency situation, the location of the person and the like. This permits even more efficient deployment of assistance.

The device for wire-free transmission of voice expediently comprises a hands-free device which preferably permits voice to be transmitted by means of voice-activated control. This permits particularly simple communication while the wearer of the belt can advantageously use his hands for other purposes.

It is also expedient if the hands-free device is configured so as to be electrically connectable to the fastening device and, for this purpose, has a contact plug which is embodied so as to fit an electrical mating contact plug of the fastening device. As a result, the hands-free device can optionally be carried and where necessary used at another location, for example in a motor vehicle.

As an alternative to, and/or in combination with, the voice-activated control it is possible for the device for the wire-free transmission of voice to be activatable using a keypad which is preferably arranged on the fastening device or a cover part connected thereto, a numerical keypad being preferred.

It is also expedient if the fastening device has a preferably separate compartment for the hands-free device which is releasably connected to it. This permits simple use or removal of the hands-free device and favorable protection against ambient influences such as moisture or liquids.

It is of particular advantage if the protection or safety elements, in particular the cable, the sensor, the signal transmitter, the alarm system, the power source and/or the security mark, are provided on the fastening device in such a way that they cannot be removed without being destroyed. As a result, additional protection is provided against unauthorized removal of such protection or safety elements.

The fastening device and a cover part which is securely connected thereto are advantageously configured in such a way that in the state in which the safety belt is being worn, they cover the fastening element in such a way that the safety belt cannot be opened by unauthorized third parties without destroying the carrier device or the cover part. As a result, additional protection possibilities are provided which do not permit the safety belt to be opened or removed by unauthorized third parties, or only permit it to be opened or removed with relatively great difficulty.

For this purpose, the fastening device or the cover part is expediently coupled with a security mechanism, which can be activated by means of a settable security code, to the fastening element in such a way that the safety belt can be opened only using the preset security code. This permits the above protection possibilities to be favorably achieved while it is easily possible for the wearer of the safety belt to open and remove the safety belt by inputting the correct security code, in particular without using additional aids such as keys or the like. This can be achieved, for example, in that the security code can be input using a keypad which is accessible from the outside in the state in which the belt is being worn and is preferably arranged on the fastening device or the cover part.

The protection or safety elements, in particular the cable, the sensor, the signal transmitter, the alarm system, the device for the wire-free transmission of voice and/or the keypad, are expediently arranged estimated (sic) or sealed with respect to liquids so that their satisfactory functioning is ensured even under the effect of liquids such as rain or spray water or, in the case of a swimmer, in water.

The fastening device is expediently plate-shaped or box-shaped. As a result, a favorable arrangement and fastening of the safety or protection elements is possible with favorable weight and advantageous compact dimensions.

The safety belt is advantageously embodied as a hip belt. This permits it to be put on in a simple normal fashion and used in particular as a trouser belt. This provides favorable wearing comfort and favorable arrangement possibilities for the fastening device with the safety protection elements so that the freedom of movement of the wearer of the belt is not impaired, or is only impaired to an insignificant degree.

Here, the fastening device and the safety or protection means which are securely connected to it are advantageously arranged ventrally or abdominally in the state in which the safety belt is being worn. This permits particularly advantageous wearing comfort with a favorable arrangement and easy operator control of the safety or protection means. This arrangement permits maximum freedom of movement for the wearer of the belt even in particular during activities of daily life.

It is of particular advantage if the fastening device and the safety or protection means which are securely connected to it form a common unit in the state in which the safety belt is being worn. As a result, all the safety or protection means can be arranged and operated particularly advantageously. Owing to the formation of a common unit, a weight-optimized design with favorable movement conditions for the wearer of the belt is obtained. In addition, a protected and secure arrangement of the safety or protection elements with a particularly favorable design of the safety belt is made possible. The above measures contribute both individually and in combination to the fulfillment of the requirements which satisfy increased safety demands, by virtue of multifunctional safety functions, and permit favorable wearing comfort and virtually unrestricted freedom of movement even when worn over a relatively long time period, in particular when carrying out a variety of activities of daily life, whether in the professional or private sphere.

Further features, points of view and advantages of the invention can be found in the following part of the description which is referred to the figures.

One preferred exemplary embodiment of the invention is described below with reference to the figures, in which.

Figure 1:
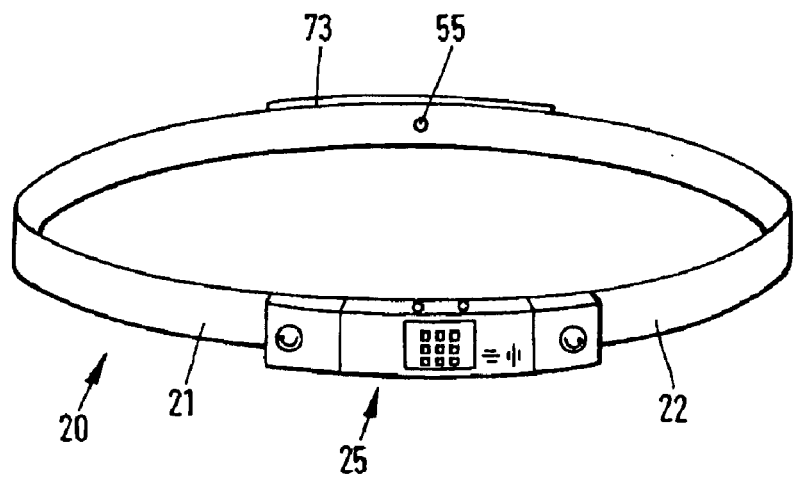
FIG. 1 shows a schematic oblique view of the safety belt with the fastening device having the safety or protection elements.

The safety belt 20 has the two belt parts 21 and 22 which permit the safety belt 20 to be put in and removed and the fastening device 25 for a variety of safety elements and protection elements. The fastening device 25 is configured in such a way that in the opened state of the seat belt 20 it is fastened only to one of the belt parts, for example, to the belt part 22. The other belt part 21 is connected, for example, to a plate-shaped coupling part which is provided with a recess. This belt part 21 can be led along in or plugged into the region underneath the free end 76 of the fastening device 25 and can then be coupled to a fastening element 50 (not illustrated in more detail in the figures) which is connected to the security catch 42. Said fastening element 50 is preferably configured with latching elements, which can be latched and unlatched, in order to easily and quickly put on and remove the safety belt 20 manually, for example in the manner of a coupling closure as is used in aircraft seat belts. In order to connect the belt parts 21, 22 securely, yet, in a releasable fashion, the plate-shaped coupling part is plugged, for example, into a mating coupling part which permits it to be held and locked and which is not illustrated in more detail in the figures either.

Figure 2:
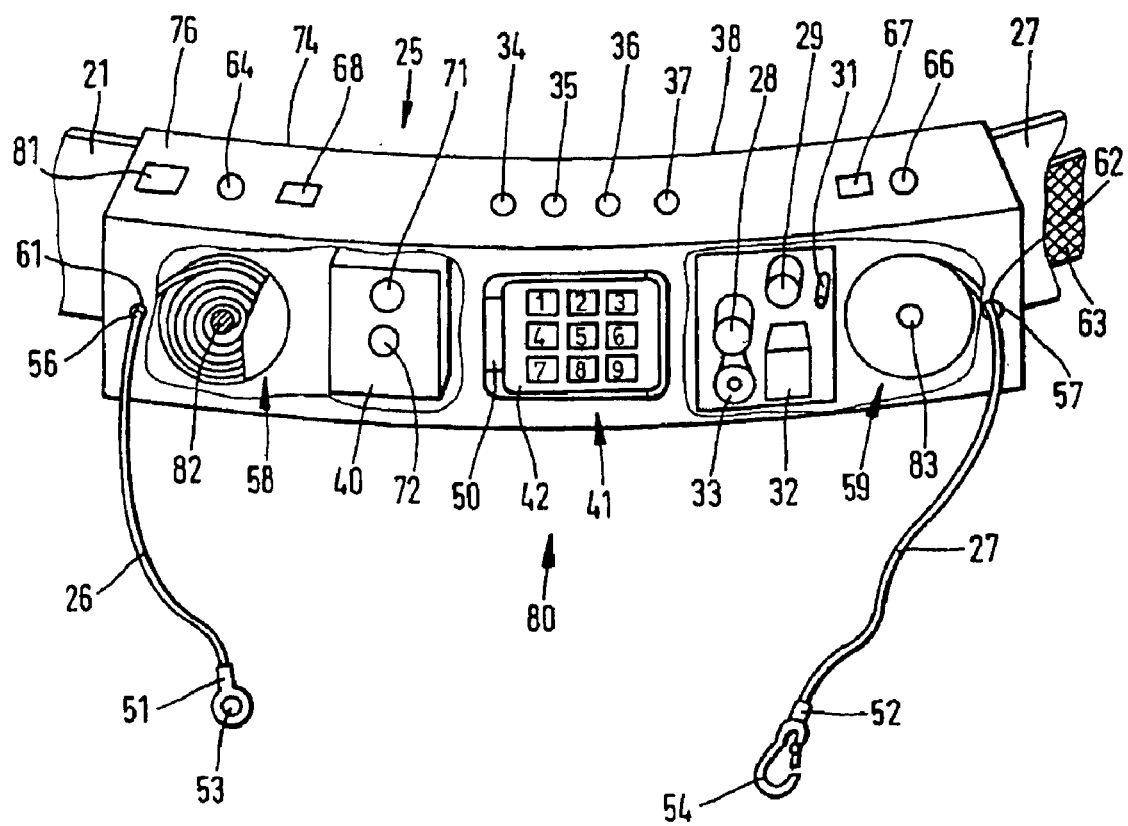
FIG. 2 shows an enlarged partial oblique view of the safety belt in the region of the fastening device with partial sections in order to illustrate better the safety elements or protection elements in a schematic view.

In the preferred exemplary embodiment shown in FIGS. 1 and 2, the fastening device 25 or carrier device for the safety or protection element is configured as a compact and uniform component, the safety or protection means which are securely connected to said carrier device forming a common unit 80 in the state in which the safety belt 20 is being worn. As a result, the fastening device 25 can be manufactured in an easy, compact and cost-effective way and a particularly advantageous protection against mechanical, chemical and chemical/physical or physical interventions can be obtained.

In addition, the advantageous arrangement and configuration of the unit 80 provides favorable wearing comfort with low overall weight of the safety belt 20 in conjunction with maximum freedom of movement for the wearer of the safety belt 20.

According to an alternative embodiment of the safety belt 20, both belt parts 21, 22 can also be securely connected to one fastening device each, one of the fastening devices being equipped with a suitably configured cover part for securely covering the fastening element 50 which permits the secure, releasable connection of the belt parts 21, 22.

The cables 26, 27, the sensors 28 to 32, the signal transmitters 33 to 37, the alarm system 40, the keypad 41, the security catch 42 and the security mark which is preferably arranged on the rear of the security catch 42, are provided as important safety or protection elements.

The cables 26, 27 each have the free ends 51, 52 to which suitably configured fastening elements, here in the form of the eyelet 53 or the bayonet hook 54, are arranged and securely connected to the respective cable 26 or 27. The cables 26, 27 can be used in various ways. They are used in particular by the wearer of the safety belt 20 to enable him to abseil in emergency situations, for example, in a domestic fire and for this purpose have a preferred length of, for example, 50 m. However, the wearer of the safety belt 20 can also use the cables 26, 27 to enable other persons to abseil or can secure objects which are fastened to the cables. In addition it is possible to use the safety belt as a receptacle device for securely fastening objects. For this purpose, suitable force-transmitting elements, for example cables, bars, chains or the like, are fastened, preferably in the closed state of the safety belt 20, to the fastening element 55, for example an eyelet, lying opposite on the rear side or relative to the fastening device 25. In this way, the objects can be secured using the safety belt 20 itself and/or using the cables 26 and 27.

The cables 26, 27 are embodied in terms of their cross section and their material properties in such a way that in particular manual unrolling or rolling up of the cables 261 [sic] 27 is made possible. Each cable 26, 27 is led through an opening 56, 57 provided in the box-shaped fastening device 25 and are arranged in the interior of the fastening device 25 so as to be capable of being unrolled or rolled up on the cable pulleys 58, 59. The axes 82, 83 of rotation of the cable pulleys 58, 59 are formed so as to be normal with respect to the basic element 38 of the fastening device 25 and/or are arranged approximately normal with respect to the longitudinal axis of the body or rear of the wearer of the belt, in the state in which the safety belt 20 is being worn. As a result, the cable pulleys 58, 59 can be arranged in a particularly space-saving way in the fastening device 25. This permits a particularly flat design of the fastening device 25 so that favorable movement possibilities can be achieved without significantly impeding the wearer of the belt. The force-transmitting points 61 and 62 which are formed in particular under load are arranged spaced apart from one another in the lateral direction so that a stable position of the human body of the wearer of the belt can be obtained during abseiling.

It goes without saying that the cables 26, 27 are configured in terms of their cross sections and their material properties in such a way that they are capable of reliably bearing at least the weight of the human body of the wearer of the belt reliably [sic] without tearing. According to one preferred embodiment, the safety belt 20 has the reinforcing material layer 63 which is preferably embodied as a reinforcing core layer, in particular in the form of a steel jacket and/or using high-performance plastics.

In order to permit braking in a controlled or metered way when loaded, the fastening device 25 is equipped with at least one braking element which can be coupled to the cables 26, 27 and which is preferably embodied with a drag clutch.

The braking element is preferably provided here with a braking force-transmitting means for transmitting the braking force to the cables 261 [sic], 27, which braking-force-transmitting means is provided with the setting means 63, 66 for variably setting the level of the braking force. The setting means, 64, 66 can be manually set using rotary sensors. Instead of the positions shown in FIG. 2, the setting means 64, 66 can also be arranged at other suitable positions where they can be easily operated, for example on the front side of the fastening device 25, in particular in the regions assigned to the cable pulleys 58, 59.

The sensors 28, 29, 31, 32 are securely connected to the fastening device 25. Here, the sensor 28 is embodied as a moisture sensor, the sensor 29 as a sensor for registering the composition of the air, the sensor 31 as a temperature sensor and the sensor 32 as a smoke detector. The sensors 28, 29, 31, 32 are used to control the signal transmitters 33, 34, 35, 36, 37 as a function of predefinable limiting values. The signal transmitter 33 is equipped as a loudspeaker for emitting audible signals. The signal transmitters 34, 35, 36, 37 make it possible to emit electrical, electromagnetic and/or other suitable alarm signals in order to inform in a suitable way the wearer of the belt himself and/or third parties about the ambient conditions registered by the sensors 28, 29, 31, 32, as a function of specific emergency situations in order to summon assistance or issue warnings in a suitable form. The signal transmitters 33, 34, 35, 36, 37 can, however, also be activated manually, for example using the activation pushbutton key 67 (FIG. 2). The sensors 28, 29, 31, 32 and the signal transmitters 33, 34, 35, 36, 37 can be configured so as to be comparatively small and lightweight so that favorable spatial conditions and weight conditions can be achieved.

In order to be able to provide assistance as quickly and efficiently as possible to the wearer of the belt when he is in an emergency, particularly precise location of the person wearing the safety belt 20 is necessary depending on the given emergency situation. For this purpose, in particular, the electrical alarm system 40 is provided which is coupled to an independent power source which is not shown in the figures. It goes without saying that the other signal transmitters 33, 34, 35, 36, 37 and the sensors 28, 29, 31, 32 can also be supplied with power using suitable an independent power source; for example, in the form of a rechargeable battery or else with a generator which can be actuated manually, the latter being possible in particular in situations in which the battery is exhausted or discharged but nevertheless the power for operating the above element can be generated.

The alarm system 40 is configured with the transmitter 71 and the receiver 72. The transmitter permits in particular the emission of signals with which bearings can be taken. The receiver makes it possible for the wearer of the safety belt 20 to receive the alarm signals and preferably to take bearings of the third parties which are in an emergency situation. Bearings can be taken, or the wearer of the safety belt 20 can be located, in a particularly precise way by embodying the alarm system 40 in such a way that it permits it to be located by means of satellite support. Accordingly, the alarm system 40 is preferably embodied as a GPS system, that is to say the Global Position Sensing system.

In order to protect fast, effective protection against overheating, for example, due to fires, or protection against (excessive) cooling in certain emergency situations, the safety belt 20 is provided with the receptacle device 3. A safety cover which is coated with aluminum or composed of aluminum is preferably arranged on or in said receptacle device 73.

The fastening device 25 itself is configured with at least one basic element 38 which is preferably embodied in a plate shape and is securely connected to one of the belt parts 21, 22. In order to securely hold the safety or protection elements, to protect against inadvertent or intentional mechanical damage or against the ingress of liquids of all types, in particular against the ingress of water, the fastening device 30, 25 is embodied in a box shape.

The fastening device 25 which is illustrated in FIGS. 1 and 2 is configured in such a way that in the state in which the safety belt 20 is being worn, the security catch 42 covers the fastening element 50 (not shown in more detail in the figures) in order to securely and releasably connect the belt parts 21, 22, in such a way that the safety belt 20 cannot be opened by unauthorized third parties without destroying the security catch 42 or the fastening device 25. Alternatively, the cover part which is securely connected to the fastening device 25 can be configured in the same way so that the safety belt 20 cannot be opened by unauthorized third parties without destroying the cover part.

As is clear in particular from FIG. 2, the fastening device 25 is embodied with the security catch 42 which permits the fastening element 50 to be actuated in the manner of a safety coupling which is customary in particular in seatbelts of aircraft seats. In order to protect the wearer of the belt against the safety belt being opened unintentionally or being opened by unauthorized third parties, the security catch 42 is connected to a security mechanism which is coupled to the fastening element 50 in such a way that only the wearer of the safety belt 20 or authorized third parties can open the safety belt 20 without damaging or destroying it. For this purpose, the fastening device 20 has the keypad 41 for inputting a presettable or security code, in which case, as is clear from the figures, the keypad 41 is integrated into the security catch 42 in such a way that it can be actuated from the outside or from the front. The security catch 42 is advantageously coupled to a sensor (not shown in more detail in the figures) which, in the event of an attempt at unauthorized opening of the security catch 42, that is to say by the application of mechanical forces which exceed specific presettable limits or by means of other physical and/or chemical interventions which are directed at damaging or destroying the safety belt 20 or its protection or safety elements, causes one or more of the signal transmitters 33, 34, 35, 36, 37 and/or [lacuna] the transmitter 71 of the alarm system 40 to be activated. As a result of one or more of the signal transmitters 33, 34, 35, 36, 37 simultaneously emitting visual, electrical and/or audible signals, it is also possible to signal, at an early time, to the unauthorized third person that his intervention is automatically detected and reported to assistance-providing third parties, for example, to the police. It goes without saying that the signal transmitters 33, 34, 35, 36, 317 [sic], in particular the signal transmitter 33 which is configured as a loudspeaker, is [sic] embodied in such a way that an alarm tone which can be heard over large distances is emitted so that unauthorized third parties can thus be made to flee.

On the inside of the fastening device 25 which is directed toward the rear of the belt, preferably at the rear of the 74 of the basic element 38 or on the inside of the security catch 42, a security mark or a similar personal identification means is provided which can be used to permit authorized persons to determine the identity of the person wearing the safety belt, for example, the name, the address and/or the telephone number of the wearer of the belt or of third parties who are to be informed.

The fastening device 25 also has a nail or other suitable easy-to-handle low-weight safety assistance elements, provided with a point, as a manually activated safety assistance element for breaking window-panes. These elements can be detachably or captively connected to the fastening device 25, for example, by means of a thin steel cable, and can be stored securely but easily accessibly in suitable receptacle devices 81.

The safety belt 20 is preferably worn as a hip belt, in particular as a trouser belt, the fastening device 25 and the safety or protection means which are connected to it being arranged, in the state in which the protection [sic] belt 20 is being worn, preferably ventrally or abdominally, that is to say in front of the abdomen of the wearer of the safety belt 20. These measures provide particularly favorable wearing comfort with maximum freedom of movement of the wearer of the safety belt 20.

LIST OF REFERENCE NUMERALS

20 Safety belt
21 Belt part
22 Belt part
25 Fastening device
26 Cable
27 Cable
28 Sensor 55
29 Sensor
31 Sensor
32 Sensor
33 Signal transmitter
34 Signal transmitter
35 Signal transmitter
36 Signal transmitter
37 Signal transmitter
38 Basic element of 25
30 40 [sic] Alarm system
41 Keypad
42 Security catch
50 Fastening element
51 Free end of 26
35 52 Free end of 27
53 Eyelet
54 Bayonet hook
55 Fastening element
56 Opening
40 57 opening
58 Cable pulley
59 Cable pulley
61 Force-transmitting point
62 Force-transmitting point
45 63 material layer?
64 Setting means
66 Setting means
67 Activation pushbutton key
71 Transmitter
72 Receiver
73 Receptacle device
74 Rear of 38
76 Free end of 25
80 Unit
81 Receptacle device
82 Axis of rotation of 58
83 Axis of rotation of 59.

What is claimed is:

1. A safety belt comprising:
   (a) at least two belt parts; and
   (b) a fastening element for securely and releasably connecting the belt parts, said fastening element comprising at least one fastening device for various security and safety elements connected to at least one of the belt parts;
   said safety belt being comfortable to wear and allowing extensive freedom of movement over long periods of time during daily activities;
   wherein the fastening device is securely connected to at least one cable having a free end and being capable of manual unrolling and rolling up of the cable;
   wherein the fastening device is securely connected to at least one braking element which can be coupled to the cable and having a drag clutch for braking the cable;
   wherein the braking element is provided with a braking-force transmitting means for transmitting the braking force to the cable, said braking-force transmitting means having a setting means for variably setting the level of the braking force; and
   wherein the setting means is coupled to a mechanism which permits the level of the braking force to be set as a function of at least one variable selected from the group consisting of body positions and cable stress.

2. Safety belt according to claim 1, wherein the fastening device is connected to a signal transmitter for emitting an alarm signal controlled manually or by at least one sensor.

3. Safety belt according to claim 1, wherein the fastening device is connected to an electrical alarm system and to an independent power source for supplying the alarm system with electrical power.

4. Safety belt according to claim 3, wherein the alarm system comprises a transmitter or a receiver.

5. Safety belt according to claim 3, wherein the alarm system comprises a global positioning satellites system permitting satellite-supported locating of said safety belt.

6. Safety belt according to claim 1, wherein the fastening device is connected to a manually activated safety aid for breaking panes of glass.

7. Safety belt according to claim 1, wherein the safety belt has a receptacle device for holding a safety cover.

8. Safety belt according to claim 1, wherein the fastening device has a security mark for personal identification, which cannot be viewed when the safety belt is being worn.

9. Safety belt according to claim 1, wherein the fastening device has a device for the wire-free transmission of voice.

10. Safety belt according to claim 9, wherein said device for the wire-free transmission of voice comprises a hands-free device which permits voice to be transmitted.

11. Safety belt according to claim 10, wherein the fastening device has a separate compartment for the hands-free device which can be detachably connected to it.

12. Safety belt according to claim 1, wherein the fastening device is adapted to receive security and safety elements in a way that prevents removal without destruction of the security and safety elements.

13. Safety belt according to claim 1 wherein the fastening device is connected to a cover part so that in the state in which the safety belt is being worn, said cover part covers the fastening element and prevents opening of the safety belt by unauthorized parties without destroying the fastening device or the cover part.

14. Safety belt according to claim 1, wherein the fastening device is adapted to protect security and safety elements received thereon from liquids.

15. Safety belt according to claim 1, wherein the fastening device has a shape selected from the group consisting of a plate and a box.

16. Safety belt according to claim 1, wherein the safety belt is embodied as a hip belt.

17. Safety belt according to claim 1, wherein in the state in which a wearer wears the safety belt, the fastening device is adapted to receive security and safety elements arranged ventrally or abdominally with respect to the wearer.

18. Safety belt according to claim 1 wherein the fastening device is adapted to receive security and safety elements so as to form a common unit when the safety belt is being worn.

19. A safety belt comprising:
(a) at least two belt parts;
(b) a fastening element for securely and releasably connecting the belt parts, said fastening element comprising at least one fastening device for various security and safety elements connected to at least one of the belt parts; and
(c) a signal transmitter connected to the fastening device for emitting an alarm signal controlled manually or by at lest one sensor designed to sense ambient conditions selected from the group consisting of temperature, humidity, composition of the air, and smoke content;
said safety belt being comfortable to wear and allowing extensive freedom of movement over long periods of time during daily activities.

20. Safety belt according to claim 19, wherein the fastening device is securely connected to at least one cable having a free end and being capable of manual unrolling and rolling up of the cable.

21. Safety belt according to claim 20, wherein two cables are provided.

22. Safety belt according to claim 20, wherein in the state in which the safety belt is being worn each cable is assigned lateral force-transmitting points which are formed under load and which are at a distance from one another.

23. Safety belt according to claim 20, wherein the cable has a cross section and material properties permitting said cable to bear at least the weight of a human body without tearing.

24. Safety belt according to claim 20, wherein the fastening device is securely connected to at least one braking element which can be coupled to the cable and having a drag clutch for braking the cable.

25. Safety belt according to claim 24, wherein the braking element is provided with a braking-force transmitting means for transmitting the braking force to the cable, said braking-force transmitting means having a setting means for variably setting the level of the braking force.

26. Safety belt according to claim 25, wherein the setting means is manually adjustable.

27. Safety belt according to claim 20, wherein the fastening device is securely connected to a cable pulley for rolling up and unrolling the cable, said pulley comprising a restoring element supporting the rolling up of the cable.

28. Safety belt according to claim 20, wherein the safety belt is connected to another fastening element element for fastening a force-transmitting element, said safety belt being connected so that, in a closed state of the safety belt, the another fastening element is arranged in a region of the safety belt opposite one or more force-application points of said at least one cable when said at least one cable is placed under load.

29. A safety belt comprising:
(a) at least two belt parts;
(b) a fastening element for securely and releasably connecting the belt parts, said fastening element comprising at least one fastening device for various security and safety elements connected to at least one of the belt parts; and
(c) a hands-free device for the wireless transmission of voice electrically connectable to the fastening device comprising a contact plug adapted to fit an electrical mating contact plug of the fastening device;
said safety belt being comfortable to wear and allowing extensive freedom of movement over long periods of time during daily activities.

30. A safety belt comprising:
(a) at least two belt parts;
(b) a fastening element for securely and releasably connecting the belt parts, said fastening element comprising at least one fastening device for various security and safety elements connected to at least one of the belt parts;
(c) a device for the wireless transmission of voice electrically connectable to the fastening device; and
(d) a keypad arranged on the fastening device or a cover part connected thereto for activating the device for the wireless transmission of voice;
said safety belt being comfortable to wear and allowing extensive freedom of movement over long periods of time during daily activities.

31. A safety belt comprising:
(a) at least two belt parts;
(b) a fastening element for securely and releasably connecting the belt parts, said fastening element comprising at least one fastening device for various security and safety elements connected to at least one of the belt parts; and
(c) a cover part coupled with a security mechanism to the fastening device so that in the state in which the safety belt is being worn, said cover part covers the fastening element and prevents opening of the safety belt by unauthorized parties without destroying the fastening device or the cover part, said security mechanism being activated by at least one settable security code that permits opening of the safety belt only by using said security code;
said safety belt being comfortable to wear and allowing extensive freedom of movement over long periods of time during daily activities.

32. Safety belt according to claim 31, wherein the security code can be input using a keypad accessible from the outside when the safety belt is being worn, said keypad being arranged on the fastening device or the cover part.

* * * * *

UNITED STATES PATENT AND TRADEMARK OFFICE
CERTIFICATE OF CORRECTION

PATENT NO. : 6,868,941 B1
DATED : March 22, 2005
INVENTOR(S) : Herman, M

It is certified that error appears in the above-identified patent and that said Letters Patent is hereby corrected as shown below:

Column 10,
Line 52, after the word "positioning" please change "satellites" to correctly read -- satellite --.

Column 11,
Line 38, please change "at lest" to correctly read -- at least --.

Signed and Sealed this

Seventh Day of June, 2005

JON W. DUDAS
*Director of the United States Patent and Trademark Office*